US007872848B2

(12) United States Patent
Song

(10) Patent No.: US 7,872,848 B2
(45) Date of Patent: Jan. 18, 2011

(54) METHOD OF IONIZING A LIQUID AND AN ELECTROSTATIC COLLOID THRUSTER IMPLEMENTING SUCH A METHOD

(75) Inventor: Weidong Song, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1277 days.

(21) Appl. No.: 11/201,788

(22) Filed: Aug. 11, 2005

(65) Prior Publication Data

US 2007/0033920 A1 Feb. 15, 2007

(51) Int. Cl.

*B05B 5/053* (2006.01)
*H05F 3/00* (2006.01)
*B05B 1/08* (2006.01)
*B05B 17/04* (2006.01)
*F03H 1/00* (2006.01)
*C03C 15/00* (2006.01)

(52) U.S. Cl. .................... 361/226; 361/227; 239/102.1; 239/102.2; 239/4; 60/202; 216/83

(58) Field of Classification Search ................. 361/226, 361/227; 239/102.1, 102.2, 4; 60/202; 216/83
See application file for complete search history.

(56) References Cited

U.S. PATENT DOCUMENTS 2,736,665 A * 2/1956 Rogers ...................... 106/1.23
3,017,115 A 1/1962 Artman et al.
3,117,029 A 1/1964 Hines
3,262,262 A 7/1966 Reader et al.
3,311,772 A 3/1967 Speiser et al.
3,552,124 A 1/1971 Banks et al.
3,573,977 A 4/1971 Banks
3,754,397 A * 8/1973 Kidd et al. .................... 60/202
4,153,201 A 5/1979 Berger et al.
4,301,968 A 11/1981 Berger et al.
4,337,896 A 7/1982 Berger et al.
4,352,459 A 10/1982 Berger et al.
4,541,564 A 9/1985 Berger et al.
4,642,581 A 2/1987 Erickson
4,655,393 A 4/1987 Berger (Continued)

OTHER PUBLICATIONS

"Ultrasonic Technology," published by Sono Tek Corporation, Milton, NY at http://www.sono-tek.com/technology/main_tech.html, 2002.

*Primary Examiner*—Fritz M. Fleming
*Assistant Examiner*—Lucy Thomas
(74) *Attorney, Agent, or Firm*—Ostager Chong Flaherty & Broitman P.C.

(57) ABSTRACT

A method of ionizing a liquid is disclosed herein. The method includes the steps of dispensing an electrically conductive liquid onto an electrically conductive membrane so as to form a liquid film on the surface of the membrane, applying an electrical charge to the liquid film on the membrane, generating ultrasonic waves to vibrate the membrane so as to induce capillary waves in the liquid film, and electrostatically attracting the electrically charged crests in the capillary waves so that electrically charged droplets are extracted from the capillary waves and accelerated therefrom for emission. The method is generally utile in various applications including, for example, spacecraft propulsion, paint spray techniques, semiconductor fabrication, biomedical processes, and the like. In addition to the above-described method, an electrostatic colloid thruster for implementing the method is disclosed herein as well.

17 Claims, 4 Drawing Sheets

U.S. PATENT DOCUMENTS 4,723,708 A 2/1988 Berger et al.
4,978,067 A 12/1990 Berger et al.
5,211,006 A 5/1993 Sohnly
5,219,120 A 6/1993 Ehrenberg et al.
5,239,820 A 8/1993 Leifer et al.
5,409,187 A * 4/1995 Dunham ..................... 244/149
6,439,474 B2 * 8/2002 Denen ..................... 239/102.2
6,516,604 B2 2/2003 Mojarradi et al.
6,659,364 B1 * 12/2003 Humberstone et al. ......... 239/4
6,996,972 B2 * 2/2006 Song ........................... 60/202
2002/0017196 A1 * 2/2002 Lichon et al. ................. 96/179
2003/0209005 A1 11/2003 Fenn
2004/0226279 A1 11/2004 Fenn
2008/0006604 A1 * 1/2008 Keady ......................... 216/83

* cited by examiner

METHOD OF IONIZING A LIQUID AND AN ELECTROSTATIC COLLOID THRUSTER IMPLEMENTING SUCH A METHOD

TECHNICAL FIELD

The present invention generally relates to methods of ionizing a liquid. The present invention more particularly relates to methods of ionizing a liquid for the emission of liquid droplets in various applications including, for example, spacecraft propulsion, paint spray techniques, semiconductor fabrication, biomedical processes, and the like.

BACKGROUND ART

Enabling a spacecraft to embark on a deep-space mission is generally quite a challenge for aerospace designers and engineers, for they must find a way to equip the spacecraft with enough propulsion capability to successfully travel long distances through space and thereby carry out the mission. In taking on the challenge of providing sufficient propulsion, designers and engineers must generally anticipate the overall mass payload likely to be onboard the spacecraft during the mission and the amount of propellant necessary to support such a payload during flight. Depending on the type of mission, the onboard payload itself may include, for example, astronauts, human life support equipment, mission-related tools and hardware, et cetera. During space flight, since the mass of dwindling propellant must also be considered as part of the spacecraft's onboard payload, designers and engineers must generally find a way to equip the spacecraft with the propulsion capability of supporting as much payload as possible with as little propellant as is necessary.

When a conventional chemical propulsion system is proposed for a given spacecraft, a large percentage of the payload mass-carrying capacity onboard the spacecraft is designated for accommodating the propellant. In designating such a large portion of the payload capacity for the propellant, the amount of payload capacity remaining for other mission-critical items is thereby generally reduced. As a result, a proposed space mission may ultimately be deemed infeasible due to payload capacity and cost design constraints. In attempting to address this problem, some studies have shown that increasing the exhaust velocity of a spacecraft's thruster(s) can significantly reduce the amount of propellant required onboard for a given space mission. To date, however, cryogenic chemical propulsion systems incorporated in rockets, for example, have only been able to produce exhaust velocities approaching 5 kilometers per second (km/s), and storable chemical propulsion systems in use onboard other spacecraft have only been able to produce exhaust velocities that are lower still. In light of such, a propulsion system that does not largely rely on energy produced through chemical reactions is instead being sought for utilization onboard a spacecraft intended for deep-space missions.

In contrast to such chemical propulsion systems, electric propulsion systems incorporated within thrusters onboard spacecraft have been shown to produce exhaust velocities on the order of about 10 km/s, or even higher. Thus, in utilizing electric propulsion systems to produce such improved velocities, the amount of propellant necessary for successful deep-space travel is thereby generally reduced. As a result, a smaller percentage of a spacecraft's payload mass-carrying capacity is taken up by the propellant, thereby allowing a larger percentage of the payload capacity to be dedicated to other items necessary for a successful space mission. In light of such, therefore, electric propulsion technology, as opposed to chemical propulsion technology, seems to be a more promising and viable candidate for being incorporated within the propulsion systems of spacecraft intended for carrying out deep-space missions.

In brief, electric propulsion systems generally fall into three main categories. These categories include electrothermal propulsion systems, electromagnetic propulsion systems, and electrostatic propulsion systems. In electrothermal propulsion systems, a propellant undergoes thermodynamic expansion via controlled thermal heating. In this way, the resultant propellant gas is accelerated until it ultimately reaches a certain exhaust velocity as naturally dictated by gas thermodynamics. In electromagnetic propulsion systems, a propellant is initially converted into plasma (i.e., an ionized gas) within, for example, a plasma production chamber. Thereafter, the plasma is accelerated via an electromagnetic field into a high-velocity exhaust stream. In electrostatic propulsion systems, a propellant is initially converted into electrically charged ions (i.e., a plasma) within, for example, an ionization chamber. Thereafter, the charged ions are accelerated via an electrostatic field into a high-velocity exhaust stream.

In recent years, the utilization of electrospray techniques as means for ionizing a liquid propellant and producing charged particles for electric propulsion has received considerable attention. In a conventional electrospray technique, a slightly conductive electrolytic liquid is channeled through a capillary needle and emitted from a tip opening in the needle. At the same time, a strong electrostatic field is applied at the tip opening of the needle, thereby causing an imbalance of surface force due to the accumulation of charges on the surface of the emitted liquid. If both the flow rate of the liquid and the electric field at the needle tip opening are maintained at proper levels or strengths, a liquid cone commonly referred to as a "Taylor cone" is thereby formed at the needle tip along with a jet issuing forth from the cone's apex. As the jet travels further away from the Taylor cone, the jet eventually becomes unstable and separates into a spray of charged droplets. In this form, the spray of charged droplets, or "electrospray," is said to be in a "cone-jet mode."

In attempting to utilize such electrospray technology for the production of charged particles (i.e., for ionization), some of the inherent benefits generally anticipated and sought after are as follows. First, electrospray ionization can be carried out by utilizing a substantially inert fluid as a propellant. Second, electrospray ionization consumes less energy than more conventional methods of electric propulsion. Third, electrosprays having various charge-to-mass (q/m) ratios can be produced by simply adjusting the flow rate of the liquid propellant and/or the strength of the applied electric field.

To date, some scientific investigations and engineering applications have already demonstrated that electrospray ionization is a suitable means, in certain instances, for producing charged particles for space propulsion. For example, electrospray technology has been utilized in thrusters incorporating electrostatic colloid propulsion systems. In general, a colloid thruster is a specific type of electrostatic thruster that operates by utilizing an electrostatic field to accelerate numerous charged liquid drops (i.e., a colloid beam) emitted from a Taylor cone to thereby generate thrust. In practice, instead of using a single capillary needle, which alone is incapable of producing the required quantity of charged drops or particles necessary for adequate propulsion, an array of emitters consisting of several hundreds of needles is commonly utilized in an individual colloid thruster. When equipped with such emitter arrays, research has shown that colloid thrusters are individually able to deliver thrust levels ranging as high as up to several hundreds of micro-newtons (μN). At such thrust levels, the high-performance propulsion of small spacecraft, including limited translation of small spacecraft through space, is thereby made possible.

In general, electrostatic colloid thrusters incorporating electrospray technology offer many attractive benefits over other electric propulsion system technologies. Some of these benefits include lower energy consumption and higher energy efficiency, which are direct results of alternatively utilizing electrospray technology to ionize propellant. Another benefit is the ability to utilize an inert propellant at ambient temperature levels. As a result of this particular benefit, a less complex and smaller sized propellant storage-and-delivery system may be utilized onboard a spacecraft, thereby improving overall system reliability and also freeing up payload space. Furthermore, still another benefit is flexibility, for colloid thrusters incorporating electrospray technology are able to provide varying thrust levels as well as a broad range of specific impulse (i.e., thrust per unit mass flow of propellant) levels.

Despite such benefits, applications of electrostatic colloid thrusters incorporating electrospray technology have primarily been limited to micro and nano-spacecraft and maintaining the precise positions of such spacecraft in space. Such relegation is mostly due to the low thrust levels and relatively low specific impulse ($I_{SP}$) levels that have been characteristic of such colloid thrusters heretofore. In particular, studies to date on the feasibility of utilizing electrospray technology onboard spacecraft for propulsion have primarily focused on the hardware (capillary needles) necessary for supporting numerous electrospray-producing liquid Taylor cones on a spacecraft. In brief, such studies have demonstrated that in order to support a large enough number of Taylor cones onboard a spacecraft to sufficiently improve thrust, the number density of capillary needles onboard a spacecraft (i.e., the number of needles per unit area) must be increased so that thousands of needles can be integrated into the spacecraft's thruster(s). Because of inherent onboard space and payload limitations, however, the actual number of capillary needles that can be successfully included aboard such a spacecraft is generally somewhat limited, and hence the number of electrospray-producing Taylor cones that can be sustained onboard is correspondingly limited as well. As a result, both the propellant mass flow rate and the level of thrust that can be achieved by such a spacecraft are also limited. Furthermore, such studies have also demonstrated that a liquid Taylor cone, when operating in the cone-jet mode by means of a capillary needle channeling electrolytic fluid in the presence of an electrostatic field, tends to produce a liquid jet that is too stable and thus generally unable to quickly separate into a spray of charged droplets. In an attempt to counteract and reduce such stability, a very high onset voltage ($V_{ON}$) is often applied between the capillary needle and an electrically conductive extractor so as to successfully extract colloid beams of discrete droplets from the Taylor cone at the needle tip's opening and thereby produce an electrospray. When such a large onset voltage is applied as such, however, the liquid Taylor cone frequently emits solvated ions (i.e., ions with water molecules attached thereto) along with the charged droplets. In general, these solvated ions characteristically have much higher charge-to-mass ratios (q/m) than the charged droplets. As a result, an overall electrospray of particles with highly disparate and non-uniform charge-to-mass ratios is ultimately produced, which is generally undesirable in electric propulsion systems. In sum, therefore, the low number density of capillary needles that can be integrated into a spacecraft's thruster(s) and also the characteristic stability of liquid jets that issue forth from liquid Taylor cones are two primary factors that have undesirably limited the thrusting capabilities, and therefore applications, of colloid thrusters incorporating electrospray technology in recent modern times.

In light of the above, there is a present need in the art for both a method and a thruster that are based on a modified electrospray technology capable of producing large quantities of uniformly charged particles for the high-performance propulsion of spacecraft in and through space.

SUMMARY OF THE INVENTION

The present invention provides a method of ionizing a liquid for the emission of liquid droplets. The method is generally utile in various applications including, for example, spacecraft propulsion, paint spray techniques, semiconductor fabrication, biomedical processes, and the like.

In one practicable methodology, the method includes the steps of (a) dispensing an electrically conductive liquid onto an electrically conductive membrane so as to form a liquid film on the surface of the membrane, (b) applying an electrical charge to the liquid film on the membrane, (c) generating ultrasonic waves to vibrate the membrane so as to induce capillary waves in the liquid film, and (d) electrostatically attracting the electrically charged crests in the capillary waves so that electrically charged droplets are extracted from the capillary waves and accelerated therefrom for emission.

In another practicable methodology, the method includes the steps of (a) operating a reservoir system to dispense an electrically conductive liquid onto an electrically conductive membrane so as to form a liquid film on the surface of the membrane, (b) operating an electrical power source to apply an electrical charge to the liquid film on the membrane, (c) operating an ultrasonic atomizer to generate ultrasonic waves and thereby vibrate the membrane so as to induce capillary waves in the liquid film, and (d) operating an electrically conductive extractor to electrostatically attract the electrically charged crests in the capillary waves so that electrically charged droplets are extracted from the capillary waves and accelerated therefrom for emission.

The present invention also provides an electrostatic colloid thruster for implementing the above-described methods. In one practicable embodiment, the thruster includes an electrically conductive extractor, an ultrasonic atomizer, a reservoir system, and an electrical power source. In general, the extractor has a plurality of holes defined therethrough, and the ultrasonic atomizer has an electrically conductive atomization surface. The atomization surface at least partially faces the extractor and is arranged relative thereto so as to define a gap. The reservoir system is in fluid communication with the atomization surface, and the electrical power source is in electric communication with both the extractor and the atomization surface. In this configuration, the reservoir system serves to dispense liquid propellant onto the atomization surface of the ultrasonic atomizer so as to form a liquid film on the atomization surface. The electrical power source, meanwhile, serves to apply opposite electrical charges to the extractor and the liquid film on the atomization surface. In this way, the electrical power source creates an electric field in the gap. The ultrasonic atomizer, in turn, serves to generate ultrasonic waves so as to vibrate the atomization surface and thereby induce capillary waves in the liquid film. Lastly, the extractor serves to electrostatically attract the electrically charged crests in the capillary waves. In this way, the extractor ultimately extracts electrically charged droplets from the capillary waves and accelerates the droplets so as to generate propulsion.

Furthermore, it is believed that various alternative methodologies, embodiments, applications, design considerations, and advantages of the present invention will become apparent to those skilled in the art when the detailed description of the best mode contemplated for practicing the invention, as set forth hereinbelow, is reviewed in conjunction with the appended claims and the accompanying drawing figures.

BRIEF DESCRIPTIONS OF THE DRAWINGS

The present invention is described hereinbelow, by way of example, with reference to the following drawing figures.

Figure 3:
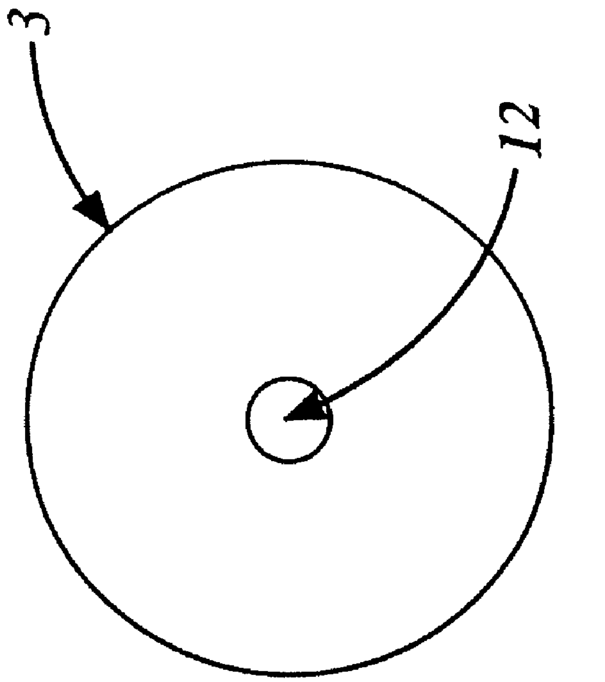
FIG. 3 is a plan diagram illustrating the electrically conductive atomization surface of an ultrasonic atomizer, which is included in the electrostatic colloid thruster of FIG. 1.
Figure 4:
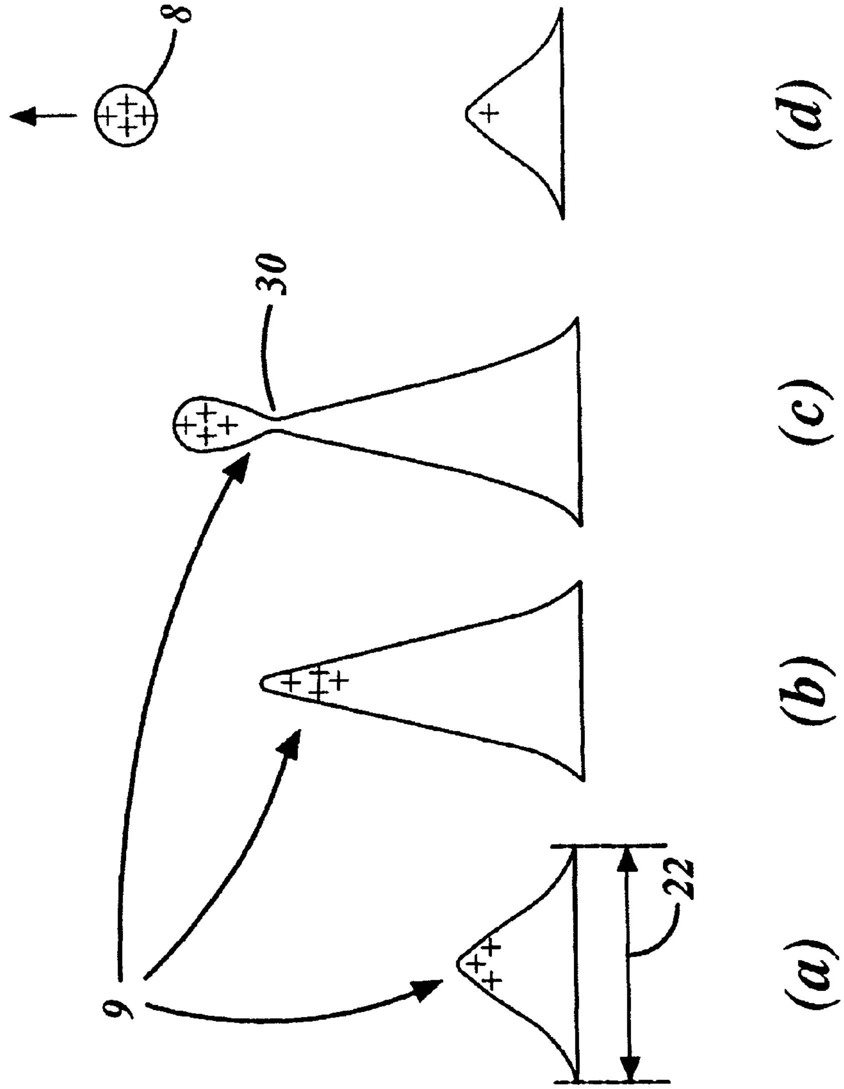

FIGS. 4(*a*) through 4(*d*) are sectional illustrations of a single capillary wave. In these illustrations, the capillary wave is undergoing various stages of deformation while on the atomization surface of FIG. 3 and during a time period wherein an electrically charged droplet is being extracted therefrom for propulsion of the electrostatic colloid thruster in FIG. 1.

Figure 5:
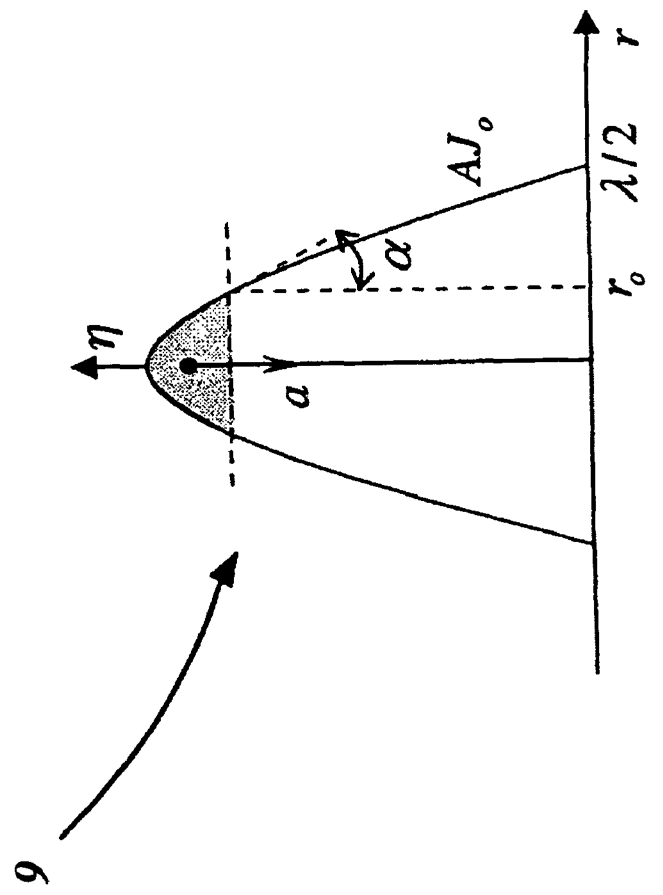

FIG. 5 is a sectional illustration of a standing capillary wave on the atomization surface of FIG. 3. In this illustration, the standing capillary wave is set forth within a two-dimensional coordinate system for the purpose of analysis.

DETAILED DESCRIPTION OF THE PREFERRED EMBODIMENTS

Figure 1:
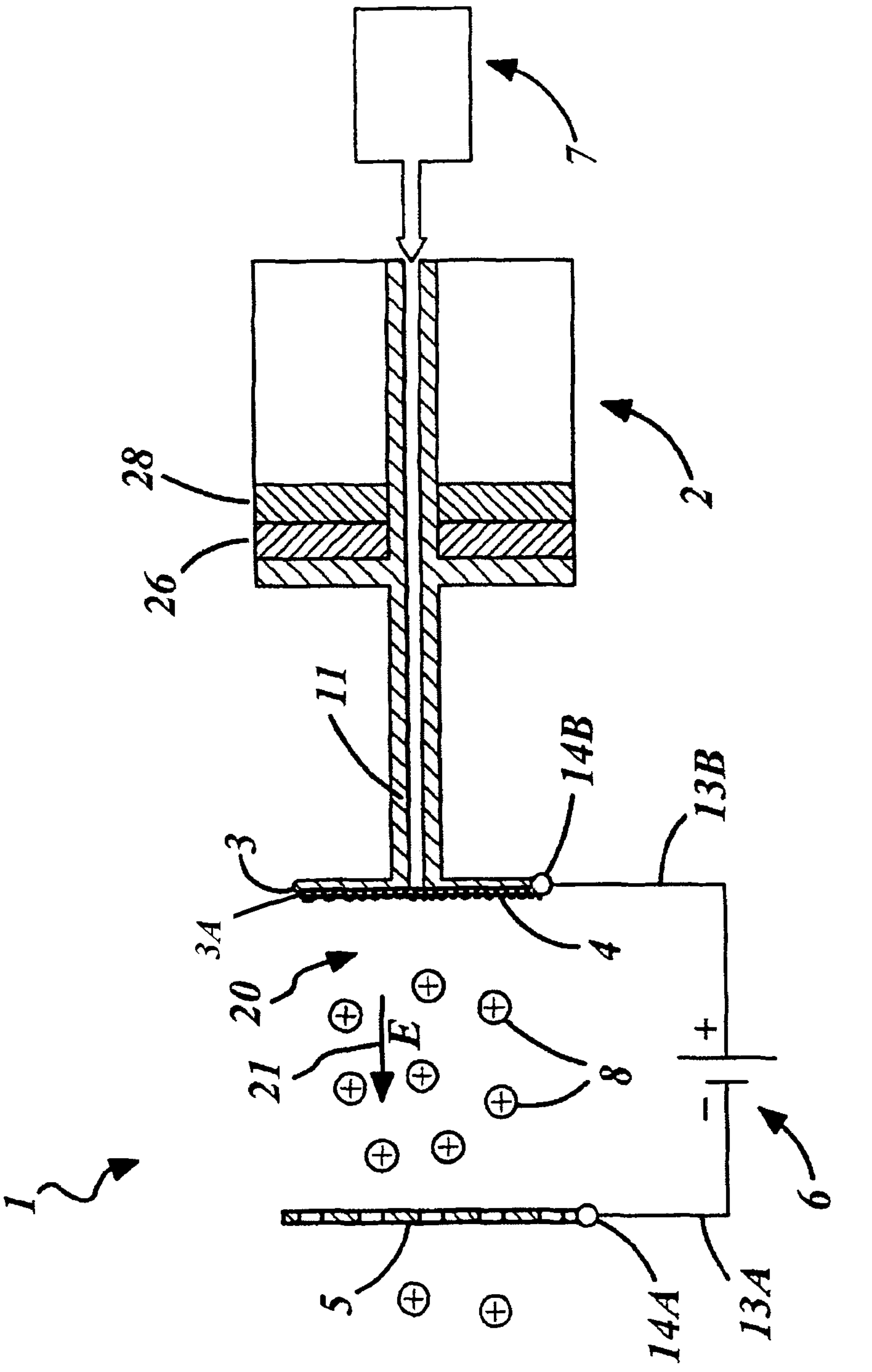
FIG. 1 is a system diagram illustrating one practicable embodiment of an electrostatic colloid thruster pursuant to the present invention.

FIG. 1 is a system diagram illustrating one practicable embodiment of an electrostatic colloid thruster 1 pursuant to the present invention. In general, operation of the thruster 1 is based on a novel modification of electrospray technology that is capable of producing large quantities of uniformly charged droplets or particles for the high-performance propulsion of spacecraft in and through space. As shown in FIG. 1, the electrostatic colloid thruster 1 basically includes an electrically conductive extractor 5, an ultrasonic atomizer 2, a reservoir system 7, and an electrical power source 6.

Figure 2:
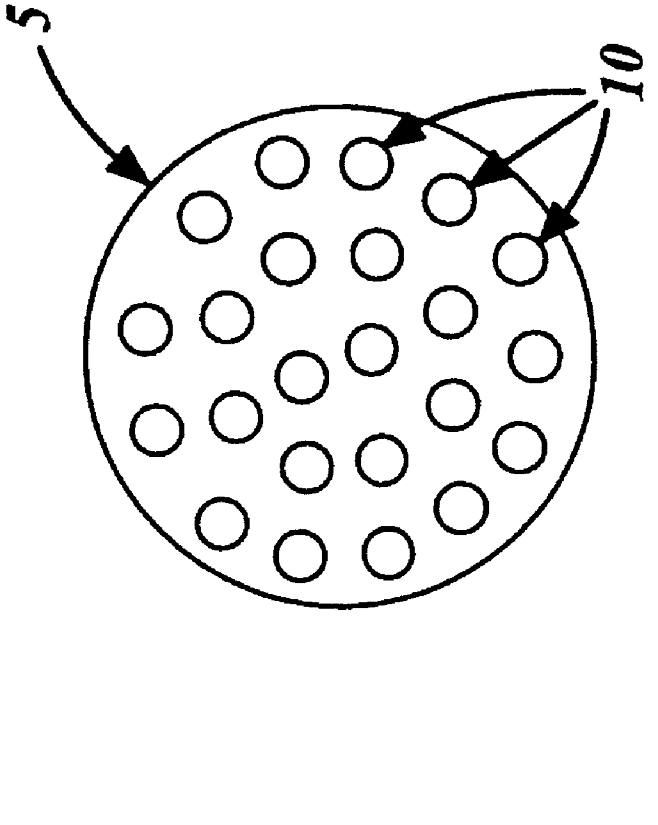
FIG. 2 is a plan diagram illustrating an electrically conductive extractor, which is included in the electrostatic colloid thruster of FIG. 1.

FIG. 2 is a plan diagram highlighting the extractor 5 illustrated in FIG. 1. As shown in the diagram, the extractor 5 is basically a plate that is substantially planar and riddled with holes 10 defined completely therethrough. The holes 10, in general, are evenly spaced apart within the plate in a somewhat array-like fashion. The extractor 5 itself largely comprises electrically conductive material and is therefore able to retain an electrical charge. In alternative embodiments, the extractor 5 may instead be an electrically conductive grid or screen.

FIG. 3 is a plan diagram highlighting an atomization surface 3 of the ultrasonic atomizer 2 illustrated in FIG. 1. The atomization surface 3 itself is substantially planar and includes a vibratile membrane 3A that is electrically conductive. As shown in FIG. 1, the atomization surface 3 is arranged relative to the extractor 5 so that both the atomization surface 3 and the extractor 5 at least partially face each other and thereby cooperatively define a gap 20. Furthermore, as shown in both FIGS. 1 and 3, the atomization surface 3 has a hole 12 defined therethrough, at or near its center. In general, the hole 12 serves as a means by which liquid propellant is dispensed and distributed onto the vibratile membrane 3A of the atomization surface 3. The liquid propellant is communicated to the hole 12 via a feed conduit 11 that is generally defined along the central axis of the ultrasonic atomizer 2.

In FIG. 1, the reservoir system 7 serves as a means for supplying liquid propellant to the atomization surface 3 of the ultrasonic atomizer 2. The reservoir system 7 itself generally includes both a tank and a conduit-and-valve system. The tank is preferably pressurized and serves as a reservoir for preliminarily storing liquid propellant. The conduit-and-valve system is connected between the tank and the feed conduit 11 of the ultrasonic atomizer 2 and includes one or more flow control valves. In this configuration, the tank of the reservoir system 7 is thereby able to supply and communicate controlled amounts of liquid propellant to the atomization surface 3 of the ultrasonic atomizer 2 via the conduit-and-valve system, the conduit 11, and the hole 12.

In general, the liquid propellant stored within the tank of the reservoir system 7 is preferably substantially inert and electrically conductive in nature. Most preferably, the propellant has a conductivity (K) of at least 1 siemens per meter (S/m). In some working scenarios, the liquid propellant may even have a conductivity of 10 S/m or higher. Given such preferred characteristics, the propellant may comprise an electrolyte or an electrolytic solution such as, for example, salt water or a tributyl phosphate solution. As an alternative, the propellant may even comprise a liquid metal such as, for example, lithium or mercury.

As shown in FIG. 1, the electrical power source 6 is electrically connected between the extractor 5 and the ultrasonic atomizer 2 via two electrical conductors 13A and 13B at electrical connection points 14A and 14B. Connected as such, the power source 6 serves to establish a difference in voltage potentials between the extractor 5 and the atomization surface 3 of the ultrasonic atomizer 2. In this way, an electric field E with a direction 21 is created in the gap 20. Although the power source 6 may be an alternating-current (AC) electrical power source in alternative embodiments, the power source 6 depicted in FIG. 1 is a direct-current (DC) electrical power source. As such, the power source 6 is preferably able to supply a voltage of up to 1000 volts (VDC) or higher.

During operation of the electrostatic colloid thruster 1, the electrical power source 6 is activated so as to establish a difference in voltage potentials between the extractor 5 and the atomization surface 3 of the ultrasonic atomizer 2. In this way, as mentioned hereinabove, an electric field E with a direction 21 is created in the gap 20. With the electric field E established in the gap 20, the reservoir system 7 works to supply and communicate controlled amounts of liquid propellant to the atomization surface 3 of the ultrasonic atomizer 2, via both the conduit 11 and the hole 12 in the ultrasonic atomizer 2, so as to form and maintain a liquid film 4 on the vibratile membrane of the atomization surface 3. With the liquid film 4 on the atomization surface 3, the ultrasonic atomizer 2 generates ultrasonic waves to set the vibratile membrane of the atomization surface 3 into a vibrating motion such that the direction of vibration is substantially perpendicular to the atomization surface 3. The ultrasonic atomizer 2 preferably generates these ultrasonic waves with a frequency of at least 20 kHz. As the vibratile membrane of the atomization surface 3 is vibrated in this manner, the liquid film 4 on the membrane absorbs some of the vibration energy and is transformed into a group of standing waves 9 conventionally known as "capillary waves." When the liquid film 4 is transformed in this manner, the capillary waves 9 generally form somewhat of a natural grid or array pattern in the liquid film 4, with regularly alternating crests and troughs generally extending in all directions across the surface of the liquid film 4. In general, these resultant capillary waves 9 are largely controlled by surface tension and preferably have wavelengths on the order of microns, or even sub-microns. In this way, for example, one square centimeter of the liquid film 4 may have a number of capillary waves 9 on the order of $1\times10^6$.

FIGS. 4(*a*) through 4(*d*) are sectional illustrations of a single capillary wave 9 existing in the liquid film 4 at different stages of deformation during vibration of the atomization surface 3. As shown in these illustrations, when an initially flat portion of the liquid film 4 absorbs some of the vibration energy from the ultrasonic waves generated by the ultrasonic atomizer 2, that same portion of the liquid film 4 then begins to "grow" in size and amplitude (A). As that portion of the liquid film 4 continues to grow in amplitude, a standing capillary wave 9 begins to form and emerge therefrom. At this same time, the electric field E existing within the gap 20 begins to cause an accumulation of charges within the emerging crest of the capillary wave 9. As the standing capillary wave 9 continues to absorb more vibration energy, the amplitude of the wave 9 correspondingly continues to increase as well, thereby producing a more defined crest at the top of the wave 9. Eventually, as the capillary wave 9 attains its largest amplitude along with a high charge accumulation in its crest, the wave 9 suddenly begins to degenerate (i.e., collapse) due to surface tension in the liquid film 4. During the initial stage of such degeneration, however, a portion of the liquid at or near the crest of the capillary wave 9, wherein significant charge accumulation exists, tends to momentarily stay in the same position due to the counteracting combination of both Coulombic force and inertial force acting thereon as well. As a result, a narrowed section 30 begins to appear within the capillary wave 9 between the highly charged portion of liquid at the crest of the wave 9 and the large portion of liquid at the base of the wave 9. Such a narrowed section 30 is herein referred to as a "wave neck." In general, the wave neck 30 appears within the capillary wave 9 where surface tension force and inertial force are approximately equal. As the standing capillary wave 9 continues to degenerate, the wave neck 30 becomes progressively thinner and eventually breaks apart. As a result, a charged droplet 8 formed at or near the wave's crest becomes fully detached from the large portion of liquid remaining at the base of the wave 9. Once fully detached, the charged droplet 8 is accelerated by the electric field E across the gap 20 and toward the oppositely charged extractor 5. At generally the same time, numerous other charged droplets 8 are similarly being detached (i.e., extracted) from their respective capillary waves 9 and accelerated across the gap 20 as well. In this way, all of the extracted droplets 8 collectively form an "electrospray" that quickly moves across the gap 20 in the direction 21. Upon reaching the extractor 5, the charged droplets 8 pass through the extractor's holes 10 and thereafter become part of a high-velocity exhaust stream of emitted particles that ultimately produces thrust.

In general, in order to produce large quantities of uniformly charged droplets 8 within the electrostatic colloid thruster 1 so as generate high-performance propulsion that is suitable for translating a spacecraft in and through space, both the degeneration (i.e., instability) of the capillary waves 9 and the strength of the electric field E must be effectively controlled in a complementary fashion to ensure the successful extraction of numerous charged droplets 8 from the electrically charged crests of the capillary waves 9. Control of these two factors is discussed hereinbelow.

With regard to the stability of capillary waves, the effects of both gravity and surface tension upon the liquid surfaces of capillary waves must generally be considered. To initially derive the displacement velocity of liquid within a capillary wave from a velocity potential ϕ, the motion of the liquid within the wave is assumed to be irrational. For the purpose of simplification, a mere two-dimensional representation of the surface of a capillary wave is herein considered in the X-Y plane. The governing equations and corresponding boundary conditions can be written as follows $$\partial_{xx}\phi + \partial_{yy}\phi = 0$$

$$-\partial_y\phi = 0 \quad (y = 0,\text{ at the bottom of the liquid film})$$

$$\frac{P_o}{\rho} - \frac{\gamma}{\rho}\partial_{xx}\eta + g(\eta_h + h) = \partial_t\phi \quad (y = h,\text{ at the top of the liquid film})$$

wherein η is the wave surface deflection in the Y direction, and $P_o$ is the pressure on the wave's surface. A solution for these equations can be written in the form as follows $$\eta = \eta_m \frac{\sinh(ky)}{\sinh(kh)}\sin(kx - \omega t)$$

wherein $$\omega = [(gk + \gamma k^3/\rho)\tanh(kh)]^{1/2}$$

is the angular frequency. From this dispersion relation, it is clear that the effect of surface tension dominates the effect of gravity in capillary waves having both short wavelengths and high frequencies. For this reason, the effect of gravity on capillary waves is omitted from the following analysis, and only the effect of surface tension is generally considered. Such a simplification in the present analysis is reasonable given that gravity is not present in the working environments of many of the space propulsion applications considered herein.

Since the surface tension controlled capillary waves considered herein exist in a thin liquid film, the capillary waves may be simply represented in mathematical terms as waves in a two-dimensional membrane. For example, for a simple (0,n) normal-mode, axially symmetric standing capillary wave set forth in a cylindrical coordinate system, the wave may be represented as $$\eta(r,t) = AJ_o(kr)\cos(\omega t)$$

wherein $J_o$ is the zeroth order Bessel function, A is the wave amplitude, $k=\omega/c_m$ is the wave number, $c_m=(\gamma/\rho h)^{1/2}$ is the wave speed, and h is the un-deformed thickness of the liquid film on the atomization surface. The wavelength λ of the capillary wave can generally be determined from the following equation $$J_o\left(k\frac{\lambda}{2}\right) = 0$$

wherein the smallest root of $J_o(u)=0$ is $u_o=2.405$ so that $k(\lambda/2)=u_o$, thereby resulting in the equation $$\lambda=2u_oc_m/\omega$$

for determining the wavelength of the capillary wave.

With the equations established and set forth above, the degeneration (i.e., instability) of capillary waves can now be analyzed hereinbelow so that major factors giving rise to such instability can be determined. In general, standing capillary waves existing in a liquid film are induced and driven by vibration of the membrane on the atomization surface of the ultrasonic atomizer. Hence, the stability of capillary waves is directly related to the characteristics of the underlying vibration itself. Therefore, if the underlying vibration is increased to a certain threshold value, the capillary waves become unstable and liquid droplets are released from the crests of the degenerating capillary waves.

FIG. 5 is a sectional illustration of a standing capillary wave 9. In this illustration, the standing capillary wave 9 is depicted within a two-dimensional coordinate system for the purpose of analysis. In general, for an unstable standing capillary wave represented by the aforementioned equation $\eta(r, t)=AJ_o(kr)\cos(\omega t)$, a droplet will be released from the wave's crest soon after the wave begins to degenerate from its maximum amplitude (A) at t=0. As $t\to 0+$ and the capillary wave continues to degenerate, the shaded area within the wave crest of the capillary wave 9 in FIG. 5 becomes a region of interest wherein $r_o$ is the capillary wave radius where the wave neck 30 begins to form, $r_o \ll \lambda$, and $r_o<h$.

In FIG. 5, the capillary wave 9 becomes unstable when the liquid at or near the wave's crest cannot be accelerated downward by the surface tension force during the wave degeneration process. Instead, this portion of liquid within the wave tends to stay in its original standing wave location. As the capillary wave 9 continues to further degenerate, a wave neck 30 soon begins to appear between the portion of liquid at the crest of the wave and the large portion of liquid at the base of the wave 9, as alluded to previously and as best shown in FIG. 4(*c*). When the radius r is small, the higher order terms of the Bessel function J can be ignored so that the Bessel function is rendered as $$J_o(kr)=1-\frac{(kr)^2}{4}.$$

To determine the capillary wave radius $r_o$ where the wave neck 30 begins to form at t=0 when the standing capillary wave 9 has its highest amplitude (A), the portion of liquid at or near the wave's crest can be treated as a rigid body for a very short time as the wave 9 begins to degenerate. When the portion of liquid at or near the wave's crest is treated as such, the acceleration rate of this portion of liquid at or near the wave's crest (where r=0) may be rendered as $$a=\delta_u\eta=-AJ_o(kr)\omega^2\cos(\omega t)=-A\omega^2.$$

In order to maintain the integrity of the wave, the surface tension acting on the shaded area of the capillary wave 9 in FIG. 5 has to satisfy the following equation $$F(r_o)>\rho V(r_o)a$$

wherein the surface tension force is $$F(r_o)=\gamma 2\pi r_o\cos(\alpha)$$

and the volume of the shaded area is $$V(r_o)=A\int_0^{r_o}2\pi r[J_o(kr)-J_o(kr_o)]\,dr=\frac{\pi}{8}Ak^2r_o^4.$$

If the surface tension cannot maintain the acceleration rate given by the aforementioned equation $a=\delta_u\eta=-AJ_o(kr)\omega^2\cos(\omega t)=-A\omega^2$, instability in the capillary wave 9 will occur and the portion of liquid at or near the wave's crest will be released and detached from the large portion of liquid at the base of the wave 9. As alluded to earlier hereinabove, the wave neck 30 generally forms and appears in the capillary wave 9 where the surface tension force and the inertial force are approximately equal, that is, where $$2\pi r_o\gamma\cos(\alpha)=\rho\left(\frac{\pi}{8}Ak^2r_o^4\right)A\omega^2.$$

Thus, as soon as the capillary wave 9 goes instable, the angle of interest a in FIG. 5 immediately approaches zero, and $\cos(\alpha)\to 1$ in the preceding equation. As a result, the capillary wave radius $r_o$ where the wave neck 30 begins to form can be solved for in the preceding equation and rendered more simply as $$r_o=\left(\frac{16\gamma}{\rho A^2\omega^2k^2}\right)^{1/3}.$$

From this equation, it is apparent that both the wave frequency $\omega$ and the wave amplitude A greatly affect the stability of a standing capillary wave 9. Thus, in operating environments wherein the wave frequency is given, $r_o$ is then determined by wave amplitude. Furthermore, if the wave amplitude A is less than a critical amplitude level $A_m$, the capillary wave 9 will remain stable and no droplet will be released from its crest.

In general, since the effect of gravity is omitted from the present analysis and only the effect of surface tension is considered, a droplet released from the crest of a degenerating capillary wave will theoretically have a spherical shape and a drop diameter $r_d$ approximated by the equation $$r_d=\left(\frac{3V(r_o)}{4\pi}\right)^{1/3}=\left(\frac{3Ak^2r_o^4}{32}\right)^{1/3}.$$

In addition, the volume flow rate Q of droplet spray produced by each individual capillary wave during degeneration is given by the equation $$Q=\frac{\omega}{2\pi}V(r_o)=\frac{A\omega k^2r_o^4}{16}.$$

Furthermore, the number density of the capillary waves is approximately $n=1/\lambda^2$, so the volume flow rate of droplet spray per unit area $Q_{total}$ can be rendered as $$Q_{total} = \frac{Q}{\lambda^2} = \frac{A\omega k^2 r_o^4}{16\lambda^2}.$$

In sum, with regard to the stability of capillary waves, the above analysis clearly demonstrates that the stability of standing capillary waves on a thin liquid film are directly affected by both the frequency and amplitude of the waves themselves. Therefore, in order to effectively control the stability of capillary waves for the purpose of releasing droplets in large quantities so as to generate high-performance propulsion, both the frequency and amplitude of the waves must be controlled. Given that the capillary waves existing in a liquid film are induced and driven by vibration of the membrane on the atomization surface of the ultrasonic atomizer, the above analysis suggests that appropriate control of both the frequency and amplitude of vibration of the atomization surface, as directly controlled by the ultrasonic atomizer, can give rise to the release of large quantities of droplets so as to generate high-performance propulsion. In experiments conducted to date, for example, a vibration frequency of 20 kHz or higher has often been desirable.

With regard to the effect of an electric field E upon the stabilities of standing capillary waves, analysis to date based on a field-immersed liquid Taylor cone without a jet issuing forth from its apex (i.e., not in cone-jet mode) has indicated that an electric field has the effect of increasing the instability of standing capillary waves. Therefore, when appropriately controlled along with both the frequency and amplitude of capillary waves, the selected strength of an electric field adds another degree of control over the capillary waves' stabilities. As an ultimate result, further control over the release and extraction of large quantities of charged droplets from the electrically charged wave crests of standing capillary waves can thus be effectively added through careful control of the electric field's strength.

In general, the method disclosed herein for producing charged droplets from the crests of capillary waves is in some aspects somewhat similar to the aforementioned method for producing charged droplets via conventional cone-jet mode techniques, except that the needle-supported liquid Taylor cones utilized in such conventional cone-jet mode techniques are uniquely replaced herein by standing capillary waves. Therefore, as compared to such conventional cone-jet mode techniques, the ionization method disclosed herein has the following novel characteristics. First, since standing capillary waves can be directly controlled by multiple factors and thereby easily rendered stable or unstable, it is therefore easy to form and extract large numbers of charged droplets from the electrically charged wave crests of capillary waves as the waves become unstable. Second, since a high number density of capillary waves is achievable in a given space or area, uniquely utilizing capillary waves to produce charged droplets can greatly enhance the mass/volume flow rate of a resultant electrospray per unit area. Third, since capillary waves are often inherently unstable, the strength or intensity of the electric field E required to successfully extract charged droplets from the crests of capillary waves for emission is relatively low. In addition, such inherent instability in capillary waves also reduces the number of high charge-to-mass (q/m) ratio solvated ions existing in a resultant electrospray and hence produces a more uniform q/m distribution in the electrospray. Such a more uniformly charged electrospray, in general, is often desirable for high-performance propulsion in an electrostatic colloid thruster.

In summary, the ionization method disclosed herein has the ability to produce electrosprays with large quantities of uniformly charged droplets. As a result, an electrostatic colloid thruster that implements the ionization method disclosed herein has the potential of delivering a thrust density that is up to 10 times greater than that of conventional ion engines or other advanced concepts, such as magnetoplasmadynamic (MPD) thrusters. In view of such high-efficiency and high-performance thrusting capability, the ionization method disclosed herein is ideal for implementation in electrostatic colloid thrusters onboard spacecraft that are to embark on missions of deep-space exploration.

Furthermore, in addition to applications involving the propulsion of spacecraft and aerospace vehicles, the ionization method disclosed herein may be adapted and utilized as an electrospray technique in, for example, commercial paint spray applications. In particular, the ionization method disclosed herein may easily be implemented within a paint spray apparatus. In such an apparatus, paint suspended within an electrically conductive liquid is communicated under pressure from a tank to a spray nozzle via, for example, a hose and a pump system. Upon reaching the spray nozzle, the liquid paint is dispensed onto an electrically charged membrane that is included on an atomization surface situated at or near the tip of the nozzle. Once the dispensed liquid paint forms a liquid film on the atomization surface of the nozzle, an ultrasonic atomizer built into the nozzle then generates ultrasonic waves so as to vibrate the atomization surface and thereby induce capillary waves in the liquid film. At generally the same time, an oppositely charged extractor connected to the nozzle and spaced apart from the atomization surface serves to electrostatically attract the electrically charged crests in the capillary waves. In this way, the extractor works to extract numerous electrically charged paint droplets from the capillary waves so as to emit a spray of paint droplets from the tip of the spray nozzle. Ultimately, by directing the spray nozzle in a desired direction, the paint droplets may be accelerated toward a target or object to be painted.

In various embodiments of the above-described paint spray apparatus, the atomization surface of the spray nozzle may take on various different contours or shapes. Such contours or shapes may be, for example, planar (i.e., flat), rounded, conic, frustum-like, or a combination thereof. Correspondingly, the extractor may take on various different contours or shapes as well. In being able to vary the contours or shapes of atomization surfaces and extractors in various embodiments of the paint spray apparatus, paint droplets emitted from the nozzle of a paint spray apparatus can be made to form spray envelopes of various desired shapes such as, for example, cylindrical or frustum shapes. In this way, a target or object being painted can be coated evenly and with a high level of precision. Furthermore, if an object to be painted is itself electrically conductive or able to retain an electrical charge, the object may optionally be electrically connected to the electrically charged extractor, or even be electrically charged itself so as to serve as an extractor. In this way, the object is made to retain an electrical charge and voltage potential that is different from that of the atomization surface on the spray nozzle. By electrically charging the object in this manner, paint droplets emitted from the nozzle's atomization surface during spraying are electrostatically attracted to the object. As a result, both the adhesion and transfer efficiency of the paint droplets onto the surface of the object are enhanced so as to minimize the waste of paint.

LIST OF PARTS AND FEATURES

To facilitate a proper understanding of the present invention, a list of parts and features highlighted with alphanumeric designations in FIGS. 1 through 5 is set forth hereinbelow.

$\lambda$ wavelength of capillary wave
$\alpha$ angle of interest
a acceleration rate of wave liquid (due to surface tension)
A amplitude of capillary wave
E electric field (in gap)
$J_o$ Bessel function (zeroeth order)
$\eta$ surface deflection of capillary wave (in Y direction)
$r_o$ capillary wave radius (where neck begins to form)
1 electrostatic colloid thruster
2 ultrasonic atomizer
3 atomization surface (including a vibratile membrane 3A)
4 liquid film
5 extractor (a hole-riddled plate)
6 electrical power source
7 reservoir system
8 charged droplet(s)
9 capillary wave(s)
10 hole(s) (defined in extractor)
11 feed conduit (for propellant)
12 hole (defined in atomization surface)
13A electrical conductor
13B electrical conductor
14A electrical connection point
14B electrical connection point
20 gap
21 direction (of electric field)
22 base width or wavelength (of capillary wave)
26 piezoelectric transducer
28 piezoelectric transducer
30 neck (of capillary wave)

While the present invention has been described in what are presently considered to be its most practical and preferred embodiments or implementations, it is to be understood that the invention is not to be limited to the particular embodiments disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as are permitted under the law.

What is claimed is:

1. A method of ionizing a liquid, said method comprising the steps of:

(a) providing an ultrasonic atomizer, a reservoir system, an electrically conductive extractor, an atomization surface which includes a vibratile membrane and an electrical power source;

(b) establishing a difference in voltage potentials between the extractor and the atomization surface to establish an electrical field;

(c) dispensing an electrically conductive liquid onto said electrically conductive vibratile membrane so as to form and maintain a liquid film on the surface of said membrane, said dispensing being accomplished with said reservoir system comprising a tank and a conduit-and-valve system;

(d) applying an electrical charge to said liquid film on said membrane;

(e) generating ultrasonic waves to vibrate said membrane so as to induce capillary waves at the surface of said liquid film; and (f) electrostatically attracting the electrically charged particles from the tips of the crests in said capillary waves and extracting said electrically charged particles by said extractor through holes defined therethrough from said capillary waves, said atomization surface and said extractor being arranged so that they cooperatively define a gap, and accelerating said particles after passing through said holes in said extractor for emission and for becoming a part of a high velocity gas stream.

2. A method according to claim 1, wherein said liquid comprises an electrically conductive solution having a conductivity of at least 1 siemens per meter.

3. A method according to claim 1, wherein said liquid comprises salt water.

4. A method according to claim 1, wherein said liquid comprises a tributyl phosphate solution.

5. A method according to claim 1, wherein step (d) is accomplished with an electrical power source selected from the group consisting of a direct- current electrical power source and an alternating-current electrical power source.

6. A method according to claim 1, wherein step (e) is accomplished with an ultrasonic atomizer.

7. A method according to claim 1, wherein said step (e) is accomplished such that said ultrasonic waves vibrate said membrane in a direction that is substantially perpendicular to said surface of said membrane.

8. A method according to claim 1, wherein step (f) is accomplished with an electrically conductive extractor.

9. A method according to claim 8, wherein said extractor comprises a structure selected from the group consisting of a screen, a grid, and a hole-riddled plate.

10. A method according to claim 1 wherein 1 square centimeter of said liquid film has a number of capillary waves in the order of $1\times10^6$.

11. A method according to claim 1 wherein the ultrasonic waves are generated with a frequency of at least 20 kHz.

12. A method according to claim 1 wherein said liquid is inert and electrically conductive.

13. A method according to claim 1 wherein said tank is pressurized and serves for preliminarily storing liquid.

14. A method according to claim 2 wherein said liquid has a conductivity of at least 10 siemens per meter.

15. A method according to claim 1 wherein said liquid comprises a liquid metal.

16. A method of ionizing a liquid, said method comprising the steps of:

(a) operating a reservoir system to dispense an electrically conductive liquid onto an electrically conductive vibratile membrane so as to form a liquid film on the surface of said membrane;

(b) operating an electrical power source to apply an electrical charge to said liquid film on said membrane;

(c) operating an ultrasonic atomizer to generate ultrasonic waves and thereby vibrate said membrane so as to induce capillary waves on the surface of said liquid and film; and (d) operating an electrically conductive extractor having holes defined therethrough to electrostatically attract the electrically charged particles from the tips of said crests in said capillary waves so that electrically charged droplets are extracted from said capillary waves, pass through said holes in said extractor and are accelerated therefrom for emission and for forming a part of a high velocity exhaust gas stream.

17. A method of ionizing a liquid said method comprising the steps of:

(a) dispensing an electrically conductive liquid onto an electrically conductive vibratile membrane so as to form a liquid film on the surface of said membrane, said dispensing being accomplished with a reservoir system comprising a tank and a conduit-and-valve system;

(b) applying an electrical charge to said liquid film on said membrane;

(c) generating ultrasonic waves to vibrate said membrane so as to induce capillary waves at the surface of said liquid film, said capillary waves having alternating crests and troughs extending in both directions in the liquid on the surface, increasing the amplitude of the waves whereby the crests become taller and the troughs deeper until a critical amplitude is reached whereupon the waves collapse and tiny electrically charged particles are ejected from the crests of the waves; and (d) collecting said electrically charged particles and accelerating them for emission.

* * * * *